US008598771B2

(12) United States Patent
Carlson et al.

(10) Patent No.: US 8,598,771 B2
(45) Date of Patent: Dec. 3, 2013

(54) GLASS AND DISPLAY HAVING ANTI-GLARE PROPERTIES (75) Inventors: Krista L Carlson, Alfred, NY (US);
Shandon D Hart, Corning, NY (US);
Kelvin Nguyen, Corning, NY (US); Lu Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 545 days.

(21) Appl. No.: 12/858,544

(22) Filed: Aug. 18, 2010

(65) Prior Publication Data

US 2011/0062849 A1    Mar. 17, 2011

Related U.S. Application Data (60) Provisional application No. 61/242,529, filed on Sep. 15, 2009.

(51) Int. Cl.
*H01J 5/16* (2006.01)
*H01J 61/40* (2006.01)

(52) U.S. Cl.
USPC ........... 313/110; 313/111; 313/113; 313/116; 313/112

(58) Field of Classification Search
None
See application file for complete search history.

(56) References Cited

U.S. PATENT DOCUMENTS

| | | | |
|---|---|---|---|
| 2,622,016 A | 12/1952 | Gilstrap et al. | |
| 3,374,141 A | 3/1968 | Junge et al. | |
| 3,616,098 A | 10/1971 | Falls | |
| 4,019,884 A | 4/1977 | Elmer et al. | |
| 6,804,053 B2* | 10/2004 | Etori et al. | 359/453 |
| 6,929,861 B2* | 8/2005 | Lin | 428/410 |
| 7,482,296 B2 | 1/2009 | Messerschmidt et al. | |
| 7,902,266 B2* | 3/2011 | Lin et al. | 522/42 |
| 8,232,218 B2* | 7/2012 | Dejneka et al. | 501/68 |
| 2001/0005282 A1 | 6/2001 | Etori et al. | |
| 2003/0170459 A1 | 9/2003 | Lin | |
| 2007/0293618 A1 | 12/2007 | Barkac et al. | |
| 2009/0142583 A1 | 6/2009 | Lin et al. | |
| 2009/0220761 A1 | 9/2009 | Dejneka et al. | |
| 2012/0218640 A1* | 8/2012 | Gollier et al. | 359/609 |
| 2012/0300304 A1* | 11/2012 | Gollier et al. | 359/599 |
| 2013/0133744 A1* | 5/2013 | Etienne et al. | 136/259 |

OTHER PUBLICATIONS

D.K.P. Huckaby; "36.2 Quantifying "Sparkle" of Anti-Glare Surfaces"; Europtec USA Inc.; 3 Pages.
"Standard Test Methods for Instrumental Measurement of Distinctness-of-Image Gloss of Coating Surfaces"; ASTM International; Designation: D5767-95 (Reapproved 2004).
"Standard Test Method for Specular Gloss"; ASTM International; Designation: D523-08.
"Standard Test Method for Haze and Luminous Transmittance of Transparent Plastics"; ASTM International; Designation D1003-07.
Richard S. Hunter; "The Measurement of Appearance"; John Wiley & Sons Inc., 1975 pp. 65-80 and pp. 225-232.

* cited by examiner

Primary Examiner — Natalie Walford
(74) Attorney, Agent, or Firm — Robert P. Santandrea (57) ABSTRACT A glass article that is ion-exchangeable and has at least one roughened surface. The roughened surface has a distinctness-of-reflected image DOI of less than 90 when measured at an incidence angle of 20°. A pixelated display system that includes such a glass article is also provided.

40 Claims, 2 Drawing Sheets

GLASS AND DISPLAY HAVING ANTI-GLARE PROPERTIES

CROSS REFERENCE TO RELATED APPLICATIONS

This application claims the benefit of U.S. Provisional Application No. 61/242,529, filed Sep. 15, 2009.

BACKGROUND

Chemically strengthened glasses are used in many handheld and touch-sensitive devices as display windows and cover plates where resistance to mechanical damage is important to the visual appearance and functionality of the product.

Reduction in the specular reflection from the surface of such displays is often desired, especially for products which are designed for outdoor use. One way to reduce the intensity of the specular reflection, commonly quantified as gloss, is to roughen the glass surface.

One result of such roughening of the glass surface is the creation of "sparkle," which is a perceived grainy appearance when used in a pixilated display system. Sparkle is manifested by the appearance of bright and dark or colored spots at approximately the pixel-level size scale. The presence of sparkle reduces the viewability of pixilated displays, particularly under high ambient lighting conditions.

SUMMARY

A glass article is provided. The glass article has at least one roughened surface. The roughened surface has a distinctness-of-reflected image (DOI) of less than 90 and a transmission haze of less than 50%. A pixelated display system that includes such a glass article is also provided.

Accordingly, one aspect of the disclosure is to provide a glass article having at least one roughened surface. The glass article has a distinctness-of-reflected image DOI of less than 90 and a transmission haze of less than 40%.

A second aspect of the disclosure is to provide a display system. The display system comprises: a glass panel and a pixelated image-displaying panel adjacent to the glass panel. The glass panel has at least one roughened surface comprising a plurality of topographical features, wherein the plurality of topographical features has an average characteristic largest feature size. The image-displaying panel has a minimum native pixel pitch dimension, wherein the average characteristic largest feature size is less than the minimum native pixel pitch dimension.

A third aspect of the disclosure is to provide an aluminosilicate glass article, wherein the aluminosilicate glass article comprises at least 2 mol % $Al_2O_3$ and is ion-exchangeable. The aluminosilicate glass has at least one roughened surface, a distinctness of image of less than 90, and a transmission haze of less than 40%.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general, it will be understood that the illustrations are for the purpose of describing particular embodiments and are not intended to limit the disclosure or appended claims thereto. The drawings may not necessarily be to scale, and certain features and certain views of the drawings may be shown exaggerated in scale or in schematic in the interest of clarity and conciseness.

A glass article is provided. In some embodiments, the glass article comprises less than 4 mol % CaO. In other embodiments, the glass article comprises less than 5% $Na_2O$. In still other embodiments, the glass article comprises at least 2 mol % $B_2O_3$. In other embodiments, the glass article comprises at least 2 mol % $ZrO_2$. In other embodiments the glass article comprises a soda lime glass.

The glass article in some embodiments comprises an aluminosilicate glass that comprises at least 2 mol % $Al_2O_3$ and is ion-exchangeable. In one embodiment, smaller metal ions in the glass are replaced or "exchanged" by larger metal ions having the same valence as the smaller ions within a layer that is close to the outer surface of the glass. For example, sodium ions in the glass can be replaced with larger potassium ions by immersing the glass in a molten salt bath containing potassium ions. The replacement of smaller ions with larger ions creates a compressive stress within the layer. In another embodiment, larger ions in the glass can be replaced by smaller ions while heating the glass to a temperature above the strain point of the glass. Upon cooling to a temperature below the strain point, a compressive stress is created in an outer layer of the glass and a central tension is created in the inner region of the glass to balance the compressive stress. In some embodiments, the outer layer has a compressive stress of at least 350 MPa and a depth (also referred to as "depth of layer") of at least 15 μm. In other embodiments, the outer layer has a compressive stress of at least 400 MPa. In some embodiments, the central tension is at least 10 MPa.

The glass article is typically a planar sheet having two major surfaces (surfaces) joined on the periphery by at least one edge, although the glass article can be formed into other shapes such as, for example, a three-dimensional shape. At least one of the surfaces is a roughened surface comprising topological/morphological features (features). Such features include, but are not limited to, projections, protrusions, depressions, pits, closed or open cell structures, particles, combinations thereof, and the like. In some embodiments, both major surfaces are roughened surfaces. In other embodiments, one major surface is a roughened surface and the other or opposite surface is optically smooth (i.e., the surface has a minimal level of roughness that does not generate visible optical scattering).

The glass article has a distinctness-of-reflected image (DOI) of less than 95 and, in some embodiments, less than 90; in other embodiments, less than 85; in other embodiments, less than 80; in other embodiments, less than 75; and, in other embodiments, less than 50. Unless otherwise specified, DOI values reported herein are measured at an incidence angle of 20° using a 2-side measurement method as described below. In another embodiment, the glass article has a DOI of less than 80, in still another embodiment, less than 40 and, in yet another embodiment, less than 20, when measured using the 2-side method. Lower DOI is generally preferred for anti-glare functionality. Depending on the specific application, however, performance trade-offs can occur when the DOI is lowered. For example, if DOI is lowered too much, haze may increase beyond acceptable limits. In another embodiment, the glass article has a DOI of less than 90 when measured at an angle of 20° from the specular direction using a 1-side sample preparation, as described below. The term "specular direction" refers the angle from the surface of the glass article at which a reflected image is viewed/observed, and is also referred to as the "specular viewing angle." DOI is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, glass reflectance factor measurements are made on the at least one roughened surface of the glass article at the specular viewing angle and at an angle slightly off the specular viewing angle. The values obtained from these measurements are combined to provide a DOI value. In particular, DOI is calculated according to the equation $$DOI = \left[1 - \frac{Ros}{Rs}\right] \times 100, \quad (1)$$

where Rs is the relative amplitude of reflectance in the specular direction and Ros is the relative amplitude of reflectance in an off-specular direction. As described herein, Ros, unless otherwise specified, is calculated by averaging the reflectance over an angular range from 0.2° to 0.4° away from the specular direction. Rs is calculated by averaging the reflectance over an angular range of ±0.05° centered on the specular direction. Both Rs and Ros were measured using a goniophotometer (Novo-gloss IQ, Rhopoint Instruments) that is calibrated to a certified black glass standard, as specified in ASTM procedures D523 and D5767, the contents of which are incorporated by reference in their entirety. The Novo-gloss instrument uses a detector array in which the specular angle is centered around the highest value in the detector array. DOI was also evaluated using 1-side (black absorber coupled to rear of glass) and 2-side (reflections allowed from both glass surfaces, nothing coupled to glass) methods. The 1-side measurement allows the gloss, reflectance, and DOI to be determined for a single surface (e.g., a single roughened surface) of the glass article, whereas the 2-side measurement enables gloss, reflectance, and DOI to be determined for the glass article as a whole. The ratio Ros/Rs is calculated from the average values obtained for Rs and Ros as described above. As used herein, the term "20° DOI," unless otherwise specified, refers to DOI measurements in which the light is incident on the sample at 20° off the normal to the glass surface, as described in ASTM D5767. The measurement of either DOI or common gloss using the 2-side method is preferably carried out in a dark room or enclosure such that measured value of these properties is zero when no sample is present.

For anti-glare surfaces, it is generally desirable that DOI be relatively low and the reflectance ratio Ros/Rs (equation (1)) is relatively high. This results in visual perception of a blurred or indistinct reflected image. In one embodiment, the at least one roughened surface of the glass article has a reflectance ratio Ros/Rs greater than 0.1, in some embodiments, greater than 0.4, and, in other embodiments, greater than 0.8, when measured at an angle of 20° from the specular direction using a 1-side sample preparation described above. When measured using the 2-side method described above, the reflectance ratio Ros/Rs of the glass article at an angle of 20° from the specular direction is greater than 0.05. In another embodiment, the reflectance ratio Ros/Rs measured by the 2-side method for the glass article is greater than 0.2 and, in a third embodiment, Ros/Rs>0.4. Common gloss, as measured by ASTM D523, is not sufficient to distinguish surfaces with a strong specular reflection component (distinct reflected image) from those with a weak specular component (blurred reflected image). This is because of the aforementioned small-angle scattering effects that are not measurable using common gloss meters designed according to ASTM D523.

Haze and DOI are simultaneously controlled to achieve optimal combinations in glass surfaces. Simultaneous control of haze and DOI yield more visually pleasing anti-glare surfaces, particularly for display applications, than control of either haze or gloss alone. This is because DOI is a much more accurate metric for matching the eye's response to blurring of reflected images, and a wider range of haze values can be created with low DOI levels than can be created with low gloss levels.

Figure 1:
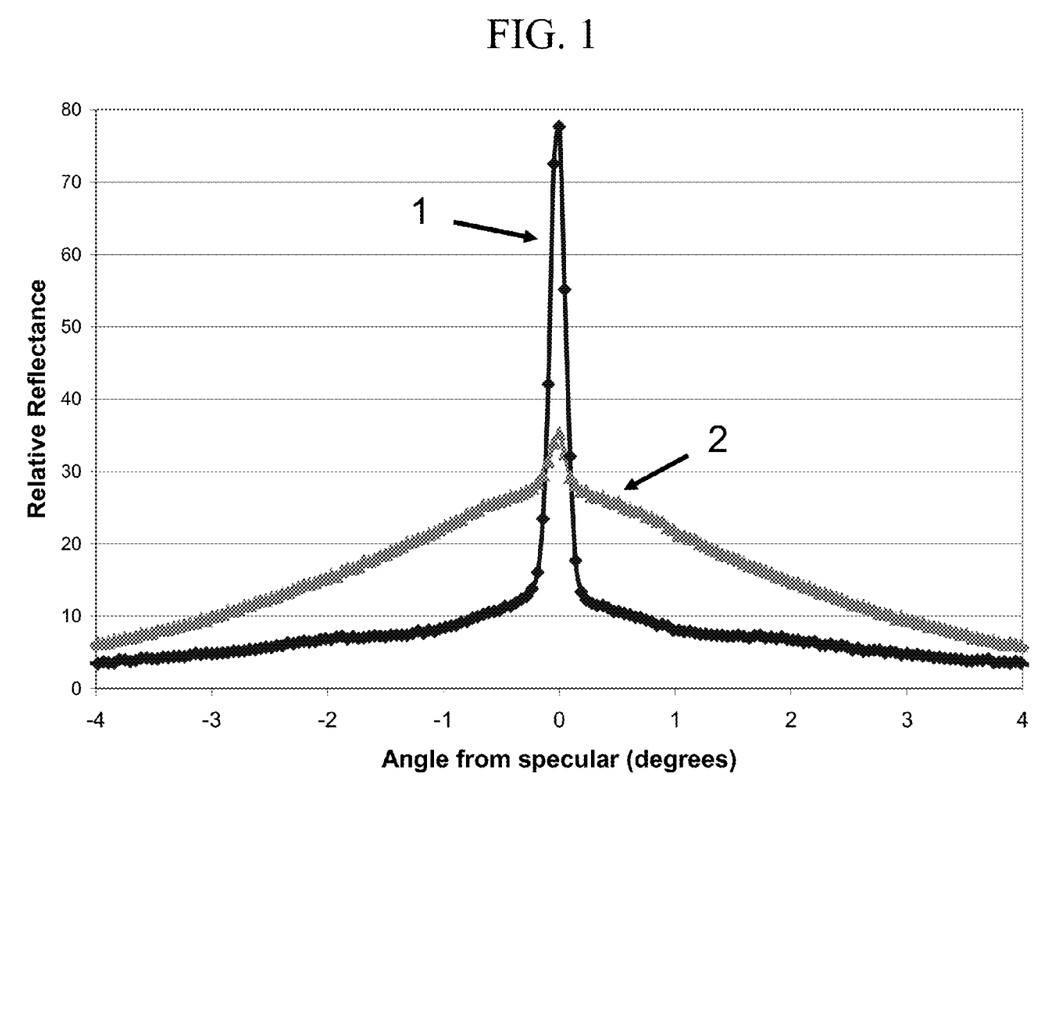
FIG. 1 is a plot of relative reflectance as a function of angle from the specular direction.

FIG. 1 illustrates the importance of small angle scattering in determining visual acceptance of anti-glare surfaces. FIG. 1 is a plot of relative reflectance as a function of angle from the specular direction, measured at 20° incidence for two surfaces that have substantially the same gloss values, as determined by the common ASTM D523 gloss measurement. Sample 1 has common 1-side gloss values of 62 and 17 at 60° and 20°, respectively, whereas sample 2 has common 1-side gloss values of 60 and 14 at 60° and 20°, respectively. The ASTM D523 method collects nearly all of the light over the entire angular range shown in FIG. 1. However, the sample having the large specular peak (sample 1 in FIG. 1) will have a much more distinct reflected image as seen by the human eye.

In one embodiment, the topological/morphological features of the at least one roughened surface has an average characteristic largest feature (ALF) size in a range from about 1 μm up to about 50 μm. In another embodiment, the ALF size is in a range from about 5 μm up to about 40 μm; in a third embodiment, in a range from about 10 μm up to about 30 μm; and, in a fourth embodiment, in a range from about 14 μm up to about 28 μm. As used herein, the average characteristic largest feature size is the average cross-sectional linear dimension of the largest 20 repeating features within a viewing field on a roughened surface. A standard calibrated optical light microscope is typically used to measure feature size. The viewing field is proportional to the feature size, and typically has an area of approximately 30(ALF)×30(ALF). If, for example, the ALF is approximately 10 μm, then the viewing field from which the 20 largest features are selected is approximately 300 μm×300 μm. Small changes in the size of the viewing field do not significantly affect ALF. The standard deviation of the 20 largest features that are used to determine ALF should generally be less than 40% of the average value (i.e., major outliers should be ignored, as these are not considered to be "characteristic" features).

The features that are used to calculate ALF are "characteristic;" i.e., at least 20 similar features can be located in the proportional viewing field. Different morphologies or surface structures can be characterized using ALF. For example, one surface structure may appear to be closed-cell repeating structures, another may appear to be small pits separated by large plateaus, and a third may appear to be a field of small particles punctuated by intermittent large smooth regions. In each case, the ALF is determined by measuring the largest 20 repeating surface regions that are substantially optically smooth. In the case of the repeating closed cell surface structure, the features to be measured are the largest of the cells in the closed-cell matrix. For the surface structure comprising small pits separated by large plateaus, the large plateaus between pits are to be measured. For the surface comprising a field of small particles punctuated by intermittent large smooth regions, the intermittent large smooth regions are to be measured. All surfaces with substantially varying morphologies can thus be characterized using ALF.

ALF is measured in the plane of (i.e., parallel to) the roughened glass surface, and is therefore independent of roughness, which is a measurement of feature variation in the z-direction—or thickness direction—perpendicular to the roughened glass surface. Selecting the largest characteristic features is an important distinction from other methods that determine a more global average feature size. The largest features are most easily seen by the human eye and are therefore most important in determining visual acceptance of the glass article.

Display "sparkle" is commonly evaluated by human visual inspection of a material that is placed adjacent to a pixelated display. ALF and its relationship to display "sparkle" has been found to be a valid metric for different materials having different surface morphologies, including glasses of varying composition and particle-coated polymer materials. A strong correlation between average largest characteristic feature size (ALF) and visual ranking of display sparkle severity exists across multiple different sample materials and surface morphologies.

Figure 2:
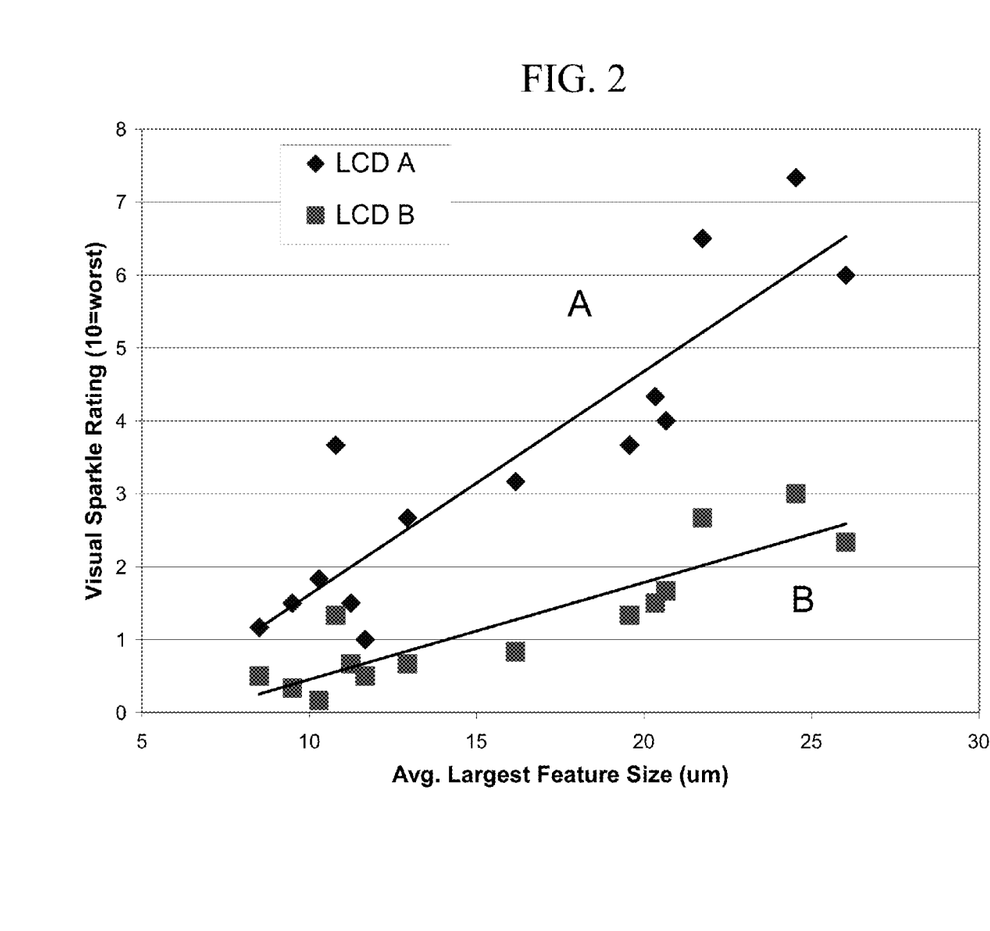
FIG. 2 is a plot of visible sparkle ranking for roughened glass samples that were placed on LCD screens as a function of average characteristic largest feature size.

The display sparkle severity of various roughened glass articles was evaluated by placing glass articles having a roughened surface on top of either of two different commercial LCD screens. The gap between the glass sample and the front of the LCD screen was controlled, and was 0.625 mm. These visual rankings were then correlated with measurements of ALF performed with an optical microscope according to the procedures previously described hereinabove. The correlation between ALF and sparkle is shown in FIG. 2, which is a plot of visible sparkle ranking as a function of average characteristic largest feature size for roughened glass samples that were placed on either of two LCD display screens. The sparkle ranking was in a scale ranging from 1 to 10, with 10 being the highest or "worst" degree of sparkle. Sparkle values were determined for an average of three viewers. One LCD display screen (LCD A in FIG. 2) had a native pixel pitch (i.e., a repeat distance between equivalent points on adjacent pixels) of 60 μm×180 μm. Sparkle values obtained using LCD A are plotted in FIG. 2, and the linear least squares line of the data is labeled "A" in the figure. The other LCD display screen (LCD B) had a native pixel pitch of 84 μm×252 μm. Sparkle values obtained using LCD B are plotted in FIG. 2, and the linear least squares line of the data is labeled "B" in the figure.

It has also been found that pixelated displays having a pixel pitch (i.e., a repeat distance between equivalent points on adjacent pixels) that is close to the ALF of the at least one roughened glass surface exhibit an increase in visible sparkle severity. This suggests that the severity of display sparkle can be minimized by either minimizing ALF or making ALF substantially different than the native pixel pitch. These two approaches must be evaluated against possible negative effects. For example, excessive shrinking or decreasing of ALF may have negative consequences such as increasing the sample haze beyond what would otherwise be desirable or increasing DOI. Thus, the ranges of ALF described herein are acceptable not only from the standpoint of sparkle, but also relative to other important properties of anti-glare surfaces.

As used herein, the term "pixel pitch" refers to the native repeat distance between equivalent points on pixels that are physically adjacent to each other. For example, a typical LCD has a red-green-blue pixel architecture. Pixel pitch is the distance between equivalent points on immediately adjacent pixels, such as between red and green pixels or between green and blue pixels. The pixel pitch can be determined using a calibrated optical light microscope by measuring any two equivalent points (e.g., the edges of the black matrix) on two adjacent pixels as long as the two points chosen are equivalent, repeating points. For rectangular pixels, the pixel pitch will have a large dimension and a small dimension that define the rectangular shape of the pixel.

With respect to display sparkle, the relationship between the size of features on the at least one roughened glass surface and pixel pitch—particularly the smallest pixel pitch—is of interest. In one embodiment, the glass article is a glass panel that forms a portion of a display system. The display system includes a pixelated image display panel that is disposed adjacent to the glass panel. The smallest pixel pitch of the display panel is greater than ALF.

In one embodiment, the at least one roughened surface of the glass article has an average RMS roughness in a range from about 10 nm up to about 800 nm. In another embodiment, the average RMS roughness is in a range from about 40 nm up to about 500 nm. In a third embodiment, the average RMS roughness is in a range from about 50 nm up to about 500 nm and, in yet another embodiment, from about 40 nm up to about 300 nm. In a particular embodiment, the average RMS roughness is greater than about 10 nm and less than about 10% of the average largest feature size. In other embodiments, the average RMS roughness is greater than about 10 nm and less than about 5% of ALF and greater than about 10 nm and less than about 3% of ALF.

The requirements of low DOI and high Ros/Rs provide limitations on the characteristic feature size and ALF. For a given roughness level, it has been found that larger feature sizes result in lower DOI and higher Ros/Rs. Therefore, to strike an optimal balance between display sparkle and DOI requirements, it is necessary to optimize anti-glare surfaces such that the surfaces have an intermediate characteristic feature size that is neither too small nor too large. It is also desirable to minimize reflected or transmitted haze, wherein transmitted haze is scattering into very high angles that can cause a milky white appearance of a roughened article under ambient lighting.

As used herein, the terms "transmission haze" and "haze" refer to the percentage of transmitted light scattered outside an angular cone of ±4.0° in accordance with ASTM procedure D1003. For an optically smooth surface, transmission haze is generally close to zero. Transmission haze of a glass sheet which is roughened on two sides ($Haze_{2\text{-}side}$) can be related to the transmission haze of a glass sheet having an equivalent surface that is roughened on only one side (Haze$_{1\text{-}side}$), according to the following approximation:

$$\text{Haze}_{2\text{-}side} \approx [(1-\text{Haze}_{1\text{-}side}) \cdot \text{Haze}_{1\text{-}side}] + \text{Haze}_{1\text{-}side}. \quad (2)$$

Haze values are usually reported in terms of percent haze. The value of Haze$_{2\text{-}side}$ obtained from Equation (2) must therefore be multiplied by 100%. In some embodiments, the glass article described herein has a transmission haze of less than about 50%; in other embodiments, less than about 40%; in other embodiments, less than about 30%; in other embodiments, less than about 20%; in other embodiments, less than about 10%; in other embodiments, less than about 5%; in other embodiments, less than about 3%; and in other embodiments, less than about 1%.

For some applications, it may be desirable to minimize the haze while maintaining low DOI with an anti-glare surface. In display applications, for example, a minimal haze will lead the to smallest amount of display contrast reduction from randomly placed ambient light sources scattering stray light towards the viewer, while maintaining low DOI (governed by small-angle-scattering) will preserve the anti-glare effect of blurring the borders of reflected images, such that reflections are rendered less sharp, less noticeable or less objectionable.

In some embodiments, the roughened surface has a RMS roughness in a range from about 50 nm up to about 500 nm, a distinctness of image (DOI) of less than about 85 and a transmission haze of less than 40%. In one such embodiment, the transmission haze is less than about 20% and the DOI is less than about 80. In another such embodiment, the transmission haze is less than about 10% and the DOI is less than about 75. In another such embodiment, the transmission haze is less than about 10% and the DOI is less than about 50. In another such embodiment, the transmission haze is less than about 5% and the DOI is less than about 85. In another such embodiment, the transmission haze is less than about 5% and the DOI is less than about 75. In another such embodiment, the transmission haze is less than about 5% and the DOI is less than about 50. In another such embodiment, the transmission haze is less than about 3% and the DOI is less than about 85. In another such embodiment, the transmission haze is less than about 3% and the DOI is less than about 75. In another such embodiment, the transmission haze is less than about 3% and the DOI is less than about 50. In another such embodiment, the transmission haze is less than about 1% and the DOI is less than about 85. In another such embodiment, the transmission haze is less than about 1% and the DOI is less than about 75. In another such embodiment, the transmission haze is less than about 1% and the DOI is less than about 50.

"Common gloss" and "gloss" refer to the measurement of specular reflectance calibrated to a standard (such as, for example, a certified black glass standard) in accordance with ASTM procedure D523. Common gloss measurements are typically performed at incident light angles of 20°, 60°, and 85°, with the most commonly used gloss measurement being performed at 60°. Due to the wide acceptance angle of this measurement, however, common gloss often cannot distinguish between surfaces having high and low distinctness-of-reflected-image (DOI) values.

As used herein, a "1-side gloss," method refers to a gloss measurement method in which a light absorbing black tape is applied to the backside (i.e., the surface of the glass article opposite the roughened surface) of the glass article. Similar to the 1-side DOI method, the 1-side gloss method allows analysis of a single glass surface and removes variability in gloss measurements due to glass thickness changes and variations in the roughness profile of the rear surface of the glass article. The 1-side gloss method is preferred because it is independent of thickness changes and allows direct comparison of glass articles having one roughened surface to glass article having two roughened surfaces. The term "2-side gloss" refers to measurements performed without the black absorbing tape, which allows reflections from both front and back surfaces of the glass to be measured. The terms "60 degree gloss" and "20 degree gloss" denote gloss measurements in which the light is incident on the sample at 60° and 20°, respectively, off the normal to the glass surface, as described in ASTM D523.

In one embodiment, the glass article and roughened surface described herein have a 1-side 60° gloss of at least 30. In a particular embodiment, the glass article has one roughened surface having an average characteristic largest feature size in a range from about 1 µm up to about 50 µm, a 1-side 60° gloss of at least 30, and a transmission haze of less than about 30%. In another embodiment, the DOI of the roughened surface, measured at 20° according to ASTM D5767 using the 1-side sample preparation method, is less than the 1-side 60° gloss value. In yet another embodiment, the DOI of the glass article, measured at 20° according to ASTM D5767 using the 2-side sample preparation method, is less than the 2-side 60° gloss value.

The glass article, in some embodiments, comprises an alkali aluminosilicate glass containing at least 2 mol % $Al_2O_3$. In one embodiment, the alkali aluminosilicate glass comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %. In another embodiment, the glass comprises at least 58 mol % $SiO_2$, in some embodiments, at least 60 mol % $SiO_2$, and includes at least one alkali metal modifier, wherein the ratio, expressed in mol %, $(Al_2O_3+B_2O_3)/\Sigma(\text{modifiers})>1$, and wherein the modifiers are selected from the group consisting of alkali metal oxides and alkaline earth metal oxides and, in particular embodiments, comprises, consists essentially of, or consists of: 60-72 mol % $SiO_2$; 9-16 mol % $Al_2O_3$; 5-12 mol % $B_2O_3$; 8-16 mol % $Na_2O$; and 0-4 mol % $K_2O$. In yet another embodiment, the alkali aluminosilicate glass comprises, consists essentially of, or consists of: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. In some embodiments, the glass is batched with 0-2 mol % of at least one fining agent selected from a group that includes $Na_2SO_4$, NaCl, NaF, NaBr, $K_2SO_4$, KCl, KF, KBr, and $SnO_2$. The aluminosilicate glass is, in some embodiments, substantially free of lithium, whereas in other embodiments, the aluminosilicate glass is substantially free of at least one of arsenic, antimony, and barium. In another embodiment, the aluminosilicate glass is down-drawable by processes known in the art, such as slot-drawing, fusion drawing, re-drawing, and the like, and has a liquidus viscosity of at least 130 kilopoise.

As previously described herein, the aluminosilicate glass article is ion-exchangeable. In one embodiment, the aluminosilicate glass article is ion exchanged to form a compressive stress layer on at least one surface of the glass article. The ion exchanged glass article has a compressive stress of at least 350 MPa with the compressive stress layer having a depth of layer of at least 15 µm. In one particular embodiment, the compressive stress is at least 400 MPa and the depth of layer is at least 15 µm. In another embodiment, the compressive stress is at least 350 MPa and the depth of layer is at least 20 µm. The compressive stress layer formed by ion exchange also creates a central tension in the inner region of the glass article. In one embodiment, the central tension is at least 10 MPa.

In one embodiment, the at least one roughened surface is created by an etching process. A multistep treatment process is generally used to form the roughened glass surface. In some cases, however, only a single etching step followed by a water rinse is required. Non-limiting examples of such processes is described in U.S. Provisional Patent Application No. 61/165,154, filed on Mar. 31, 2009, by Krista L Carlson et al., entitled "Glass Having Anti-Glare Surface and Method of Making;" and U.S. patent application Ser. No. 12/730,502, filed on Mar. 24, 2010, by Krista L Carlson et al., which has the same title as and claims priority from U.S. Provisional Patent Application No. 61/165,154. The contents of both applications are incorporated herein by reference in their entirety, and describe methods in which a glass surface is treated with a first etchant to form crystals on the surface. A region of the surface adjacent to each of the crystals is then etched to a desired roughness, followed by removing the crystals from the glass surface, and reducing the roughness of the surface of the glass article to provide the surface with a desired haze and gloss.

In one non-limiting example, the multistep treatment comprises a first roughening step in which the glass article is immersed in a first bath or otherwise contacts a solution, gel, or paste comprising 5-20 wt % ammonium bifluoride ($NH_4HF_2$), 0-5 wt % of a fluorinated or non-fluorinated alkali or alkaline earth salt (e.g., $NaHF_2$ or $CaCl_2$), and 10-40% of an organic solvent such as isopropyl alcohol or propylene glycol. A viscosity modifier such as xanthan gum or methyl cellulose can be optionally added at 0-3 wt % to the first bath. These viscosity modifiers may partially or completely replace the organic solvent and can allow the formation of a gel or a paste, which is preferable for some etching geometries. In addition, various surfactants such as fluorinated surfactants can be added to the first bath to partially or completely replace the organic solvent. Non-limiting examples of fluorinated surfactants include Zonyl™ and Capstone™, manufactured by DuPont, and Novec™ manufactured by 3M. This first step can form a layer of fluorinated crystals on the glass surface. These crystals are later removed by rinsing with water or by subsequent chemical treatment steps.

An optional second step in the etching/roughening process can include immersion or other treatment in a second solution comprising a non-fluorinated mineral acid such as sulfuric acid, hydrochloric acid, nitric acid, phosphoric acid, or the like. The acid concentration can be in the range of 0.1 up to 3 moles/liter. The second solution can be either heated or non-heated. Alternatively, the second solution may be water only. This optional second step can serve to partially dissolve the fluorinated crystals formed in the first etching step. This partial dissolution either partially or completely removes the crystals from the glass surface. Partial dissolution or removal can aid final removal in the next step, which includes either rinsing or further acid etching.

The optional third step (or second step, if the second step described above is omitted), can involve immersion or other treatment with an acidic solution containing 2-10 wt % hydrofluoric acid and 2-30 wt % of a mineral acid such as hydrochloric acid, sulfuric acid, nitric acid, phosphoric acid, or the like. The glass surface can be etched in the solution for time periods ranging from 3 up to 60 minutes, with longer times generally leading to a greater reduction in the surface roughness. This optional third step can also involve treatment with a basic solution instead of an acidic solution, such as a solution containing NaOH and EDTA.

The ranges of concentrations and etching times listed hereinabove are representative of preferred ranges. It will be appreciated by those skilled in the art that concentrations and etching times outside the ranges described above can be used to obtain the roughened surface of the glass article.

In one embodiment, a glass article that is roughened on one surface or in one region of a surface can be obtained by masking at least a portion of a surface during etching. Non-limiting examples of such masking methods are described in U.S. Provisional Patent Application No. 61/165,154, previously referenced hereinabove. A non-limiting example of a suitable masking film is ANT™ film, manufactured by Seil Hi-Tech. Other methods for etching/roughening a single surface of a glass article include applying an etching solution, paste, or gel on a single surface of the glass article by one of rolling, spraying, or other methods known in the art. In one embodiment, spatial variations or indicia can be created in a surface of the glass article by providing a masking film having either a positive or negative image of a design that is to be made in ether a smooth or roughened surface of the article.

In another embodiment, the roughened surface is created by an etching process in which a layer of sacrificial particles is first deposited on at least one surface of the glass article and contacting the particle-treated surface with an etchant to form the roughened surface, as described in U.S. Provisional Patent Application No. 61/329,936, filed Apr. 30, 2010 by Diane K. Guilfoyle et al., entitled "Anti-Glare Surface Treatment Method and Articles Thereof," the contents of which are incorporated herein by reference it their entirety.

In another embodiment, the roughened surface is created by forming a protective film, which can comprise a pore-forming polymer or random spots of protective material, on selected portions of at least one surface of the article, contacting the at least one surface with a liquid etchant; and removing the protective film from the surface of the article to form the anti-glare surface, as described in U.S. Provisional Patent Application No. 61/329,951, filed Apr. 30, 2010 by Jeffrey T. Kohli et al., entitled "Anti-Glare Surface and Method of Making," the contents of which are incorporated herein by reference it their entirety.

In some embodiments, surfaces having both low haze and low DOI can be obtained by dipped the glass article in a static solution containing ammonium fluoride ($NH_4F$), propylene glycol, HCl, and HF, followed by rinsing in deionized water. The glass can be optionally immersed in a $H_2SO_4$ bath for cleaning purposes, and/or a HF-containing bath.

The surface and optical properties described herein can also be provided by alternate roughening procedures such as, but not limited to, etching with different chemicals, mechanical abrasion followed by etching, laser ablation, particle or frit coating and sintering, sol-gel coating and sintering, pressing or embossing the glass against a mold above the softening temperature of the glass, and the like.

A display system is also provided. The display system includes at least one aluminosilicate glass panel, as described hereinabove, and a pixelated image-displaying panel adjacent to a surface of the aluminosilicate glass panel. The pixelated image displaying panel can, for example, be one of an LCD display, an OLED display, or the like. The display system can also include touch-sensitive elements or surfaces. The aluminosilicate glass is ion exchanged and has at least one roughened surface comprising a plurality of features having an average largest feature size, or ALF, as previously described herein, and the image-displaying panel has a minimum native pixel pitch. The minimum native pixel pitch is greater than the ALF of the roughened surface of the aluminosilicate glass panel.

EXAMPLES

The following examples illustrate the features and advantages of the present disclosure and are in no way intended to limit the disclosure or appended claims thereto.

All aluminosilicate glass sheets described in the following examples had the following composition: 66 mol % $SiO_2$; 10 mol % $Al_2O_3$; 0.6 mol % $B_2O_3$; 14.0 mol % $Na_2O$; 2.5 mol % $K_2O$; 5.7 mol % MgO; 0.6 mol % CaO; 0.01 mol % $ZrO_2$; 0.21 mol % $SnO_2$; and 0.008 mol % $Fe_2O_3$. All glass sheets, with the exception of Example 5, were etched without masking, so that both surfaces of the glass sheets were etched. Comparison of etching on one vs. both sides has an effect on measured transmission haze as well as 2-side gloss and 2-side DOI, but should not affect the measurements of 1-side gloss and 1-side DOI, which substantially isolate the light reflected from a single surface of the glass. All glass sheets described in the following examples had an initial thickness of 0.7 mm.

Example 1

An aluminosilicate glass sheet was dipped in a static solution consisting of 6 wt % $NH_4HF_2$ and 10% propylene glycol for 5 minutes. The glass sample was then rinsed in deionized (DI) water for 1 minute, followed by immersion in 1 Molar $H_2SO_4$ for 5 minutes. The sample was held vertically for ease of fluid travel over the surface and mechanically agitated while immersed in the $H_2SO_4$ bath using a vertical motion. The agitation speed was approximately 2 Hz and the travel distance was approximately 2 inches. The sample was then rinsed again in DI water for 1 minute, followed by immersion in a solution of 4 wt % HF+4 wt % HCl for 10 minutes. The sample was agitated in the HF+HCl bath using the same agitation method used in the $H_2SO_4$ bath. As a final step, the sample was rinsed again in DI water and dried using nitrogen air flow. Optical and surface measurement results obtained for the sample are summarized in Table 1.

Example 2

An aluminosilicate glass sheet was dipped in a static solution consisting of 10 wt % $NH_4HF_2$ and 10% propylene glycol for 10 minutes. The glass sample was then rinsed in DI water, immersed in a $H_2SO_4$ bath with vertical agitation, rinsed again in DI water, immersed in a solution of 4 wt % HF+4 wt % HCl with vertical agitation, rinsed again in DI water, and dried using nitrogen air flow, as described in Example 1. Optical and surface measurement results obtained for the sample are summarized in Table 1.

Example 3

An aluminosilicate glass sheet was dipped in a static solution consisting of 10 wt % $NH_4HF_2$ and 20% propylene glycol for 5 minutes. The glass sample was then rinsed in DI water, immersed in a $H_2SO_4$ bath with vertical agitation, rinsed again in DI water, immersed in a solution of 4 wt % HF+4 wt % HCl with vertical agitation, rinsed again in DI water, and dried using nitrogen air flow, as described in Example 1. Optical and surface measurement results obtained for the sample are summarized in Table 1.

Example 4

An aluminosilicate glass sheet was dipped in a static solution consisting of 10 wt % $NH_4HF_2$, 2% $NaHF_2$, and 20% propylene glycol for 5 minutes. The glass sample was then rinsed in DI water, immersed in a $H_2SO_4$ bath with vertical agitation, rinsed again in DI water, immersed in a solution of 4 wt % HF+4 wt % HCl with vertical agitation, rinsed again in DI water, and dried using nitrogen air flow, as described in Example 1. Optical and surface measurement results obtained for the sample are summarized in Table 1.

Example 5

This glass sample was etched on only one side, as opposed to all other samples described in Examples 1-4 and 6, which were etched on both sides. This sample was masked on one side with ANT™ film made prior to etching. An aluminosilicate glass sheet was dipped in a static solution consisting of 8 wt % $NH_4HF_2$ and 20% propylene glycol for 10 minutes. The glass sample was then rinsed in DI water, immersed in a $H_2SO_4$ bath with vertical agitation, rinsed again in DI water, immersed in a solution of 4 wt % HF+4 wt % HCl with vertical agitation, rinsed again in DI water, and dried using nitrogen air flow, as described in Example 1. Optical and surface measurement results obtained for the sample are summarized in Table 1.

Example 6

An aluminosilicate glass sheet was dipped in a static solution consisting of 7 wt % $NH_4HF_2$ and 20% propylene glycol for 15 minutes. The glass sample was then rinsed in DI water, immersed in a $H_2SO_4$ bath with vertical agitation, rinsed again in DI water, immersed in a solution of 4 wt % HF+4 wt % HCl with vertical agitation, rinsed again in DI water, and dried using nitrogen air flow, as described in Example 1. Optical and surface measurement results obtained for the sample are summarized in Table 1.

TABLE 1

Summary of optical and surface properties of glass samples described in Examples 1-6.

| Aluminosilicate Glass Sample | Avg. Largest Characteristic Feature Size (um) | RMS Roughness (nm) | Transmission Haze | ASTM D523, 'Common' Gloss | | | | Ros/Rs (at 0.3 degrees) | DOI | Ros/Rs (at 0.3 degrees) | DOI |
|---|---|---|---|---|---|---|---|---|---|---|---|
| | | | | 20° Gloss 1-side | 20° Gloss 2-side | 60° Gloss 1-side | 60° Gloss 2-side | 1-side | 1-side | 2-side | 2-side |
| Example #1 | 10.8 | 124 | 8.0 | 16 | 20 | 62.1 | 72 | 0.53 | 47.3 | 0.65 | 35.3 |
| Example #2 | 24.5 | 268 | 15.3 | 9 | 11 | 42.4 | 48.5 | 0.89 | 11.4 | 0.91 | 8.8 |
| Example #3 | 10.3 | 50.4 | 6.8 | 36 | 46 | 73.4 | 89 | 0.04 | 96.1 | 0.06 | 93.9 |
| Example #4 | 12.9 | 231 | 32.7 | 0.5 | 1.5 | 21 | 26 | 0.98 | 1.6 | 0.98 | 1.6 |

TABLE 1-continued

Summary of optical and surface properties of glass samples described in Examples 1-6.

| Aluminosilicate Glass Sample | Avg. Largest Characteristic Feature Size (um) | RMS Roughness (nm) | Transmission Haze | ASTM D523, 'Common' Gloss | | | | Ros/Rs (at 0.3 degrees) Measurement method | DOI | ASTM D5767 Ros/Rs (at 0.3 degrees) | DOI |
|---|---|---|---|---|---|---|---|---|---|---|---|
| | | | | 20° Gloss 1-side | 20° Gloss 2-side | 60° Gloss 1-side | 60° Gloss 2-side | 1-side | 1-side | 2-side | 2-side |
| Example #5 | 14.0 | 161 | 11.8 | 12 | 47 | 52 | 70 | 0.28 | 71.6 | 0.10 | 90.0 |
| Example #6 | 18.2 | 169 | 13.6 | 5 | 6 | 42 | 45 | 0.91 | 9.3 | 0.97 | 2.9 |

Examples 7-9

Examples 7-9 illustrate a process that is especially well suited for providing glass surfaces having both low haze and low DOI. In these examples, an aluminosilicate glass (Corning 2318) sheet was dipped in a static solution consisting of 0.9 M ammonium fluoride ($NH_4F$), 2.4 M propylene glycol, 0.5 M HCl, and 0.6 M HF for 8-12 minutes. The glass samples were then rinsed in deionized water, optionally immersed in a $H_2SO_4$ bath for cleaning purposes, and finally rinsed in DI water, and dried using nitrogen air flow. The glass can be optionally further etched in an HF-containing bath (as in the preceding examples. In Example 7, both surfaces of the glass sheet were exposed to the etch bath, creating an anti-glare surface on both sides of the sample. In Example 8, one surface of the glass was protected by a sacrificial polymer film when placed in the etch bath, resulting in an anti-glare surface on a single side of the glass sheet. A polymer anti-splinter or anti-reflection film was laminated to one surface of the glass sheet in Example 9, while maintaining the low haze and low DOI properties. Optical data for Examples 7-9 are listed in Table 2.

TABLE 2

Summary of optical and surface properties of glass samples described in Examples 7-9.

| Sample | 1-side or 2-side AG treatment | Transmission Haze | 20° DOI (2-side) | 60° gloss (2-side) |
|---|---|---|---|---|
| Example 7 | 1 | 0.19 | 71 | 144 |
| Example 8 | 2 | 0.3 | 37 | 131 |
| Example 9 (Glass + Film) | 1 | 0.25 | 68 | 141 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article having at least one roughened surface, wherein the glass article has a distinctness-of-reflected image of less than 90 and a transmission haze of less than 40%.

2. The glass article of claim 1, wherein the at least one roughened surface comprises a plurality of topographical features, the plurality of topographical features having an average characteristic largest feature size in a range from 1 μm up to about 50 μm.

3. The glass article of claim 2, wherein the at least one roughened surface has an average RMS roughness that is less than 10% of the average characteristic largest feature size and greater than 10 nm.

4. The glass article of claim 1, wherein the at least one roughened surface has an average RMS roughness in a range from about 10 nm up to about 800 nm.

5. The glass article of claim 1, wherein the glass article is a glass panel that forms a portion of one of a display system and a touch-sensitive input device.

6. The glass article of claim 5, wherein the display system comprises a pixelated image display panel adjacent to the glass article article, the image-displaying panel having a minimum native pixel pitch dimension that is greater than the average characteristic largest feature size.

7. The glass article of claim 1, wherein the at least one roughened surface has a reflectance ratio $R_{os}/R_s$, where $R_{os}$ is relative reflectance averaged within a range from 0.2° to 0.4° away from the specular direction and $R_s$ is relative reflectance averaged within a range of ±0.05° centered in the specular direction, and wherein $R_{os}/R_s$ is greater than 0.1.

8. The glass article of claim 1, wherein the glass article comprises less than 4 mol % CaO.

9. The glass article of claim 1, wherein the glass article comprises less than 5 mol % $Na_2O$.

10. The glass article of claim 1, wherein the glass article comprises at least 2 mol % $B_2O_3$.

11. The glass article of claim 1, wherein the glass article comprises an alkali aluminosilicate glass comprising at least 2 mol % $Al_2O_3$.

12. The glass article of claim 11, wherein the alkali aluminosilicate glass is ion exchanged to form a compressive stress layer on at least one surface of the glass article.

13. The glass article of claim 12, wherein the ion exchanged glass has a compressive stress of at least 350 MPa and a compressive depth of layer of at least 15 microns.

14. The glass article of claim 12, wherein the ion exchanged glass has a central tension of at least 10 MPa.

15. The glass article of claim 11, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % ≤ $Li_2O+Na_2O+K_2O$ ≤ 20 mol % and 0 mol % ≤ MgO+CaO ≤ 10 mol %.

16. The glass article of claim 11, wherein the alkali aluminosilicate glass comprises at least 58 mol % $SiO_2$ and at least one alkali metal modifier, wherein the ratio, expressed in mol %, ($Al_2O_3$ (mol %)+$B_2O_3$ (mol %))/Σ(modifiers (mol %))>1, and wherein the modifiers are selected from the group consisting of alkali metal oxides and alkaline earth metal oxides.

17. The glass article of claim 16, wherein the alkali aluminosilicate glass comprises: 60-72 mol % $SiO_2$; 9-16 mol % $Al_2O_3$; 5-12 mol % $B_2O_3$; 8-16 mol % $Na_2O$; and 0-4 mol % $K_2O$.

18. The glass article of claim 11, wherein the alkali aluminosilicate glass comprises: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO.

19. A display system, the display system comprising:
   a. a glass panel, wherein the glass panel has at least one roughened surface, the roughened surface having a distinctness-of-reflected image DOI of less than 90 and a transmission haze of less than 40% and comprising a plurality of topographical features, the plurality of topographical features having an average characteristic largest feature size; and
   b. a pixelated image-displaying panel adjacent to the glass panel, the image-displaying panel having a minimum native pixel pitch dimension, wherein the average characteristic largest feature size is less than the minimum native pixel pitch dimension.

20. The display system of claim 19, wherein the at least one roughened surface has an average RMS roughness in a range from about 10 nm up to about 800 nm.

21. The display system of claim 19, wherein the at least one roughened surface has an average RMS roughness that is less than 10% of the average characteristic largest feature size and greater than 10 nm.

22. The display system of claim 19, wherein the at least one roughened surface has a reflectance ratio $R_{os}/R_s$, where $R_{os}$ is relative reflectance averaged within a range from 0.2° to 0.4° away from the specular direction and $R_s$ is relative reflectance averaged within a range of ±0.05° centered in the specular direction, and wherein $R_{os}/R_s$ is greater than 0.1.

23. The display system of claim 19, wherein the glass panel is an alkali aluminosilicate glass panel comprising at least 2 mol % $Al_2O_3$.

24. The display system of claim 23, wherein the alkali aluminosilicate glass panel is ion exchanged to form a compressive stress layer on at least one surface of the glass panel.

25. The display system of claim 24, wherein the ion exchanged glass panel has a compressive stress of at least 350 MPa and a compressive depth of layer of at least 15 microns.

26. The display system of claim 24, wherein the ion exchanged glass panel has a central tension of at least 10 MPa.

27. An aluminosilicate glass article, wherein the glass article comprises at least 2 mol % $Al_2O_3$ and is ion-exchangeable, and wherein the aluminosilicate glass has at least one roughened surface, the glass article having a distinctness-of-reflected image DOI of less than 90 and a transmission haze of less than 40%.

28. The aluminosilicate glass article of claim 27, wherein the at least one roughened surface comprises a plurality of topographical features, the plurality of topographical features having an average characteristic largest feature size in a range from 1 μm up to about 50 μm.

29. The glass article of claim 27, wherein the at least one roughened surface has an average RMS roughness in a range from about 10 nm up to about 800 nm.

30. The glass article of claim 27, wherein the at least one roughened surface has an average RMS roughness that is less than 10% of the average characteristic largest feature size and greater than 10 nm.

31. The glass article of claim 27, wherein the glass article is a glass panel that forms a portion of one of a display system and a touch-sensitive input device.

32. The glass article of claim 30, wherein the display system comprises a pixelated image display panel adjacent to the glass panel, the image-displaying panel having a minimum native pixel pitch dimension that is greater than the average characteristic largest feature size.

33. The glass article of claim 27, wherein the at least one roughened surface has a reflectance ratio $R_{os}/R_s$, where $R_{os}$ is relative reflectance averaged within a range of ±0.4° off the specular direction and $R_s$ is relative reflectance averaged within a range of ±0.05° centered in the specular direction, and wherein $R_{os}/R_s$ is greater than 0.1.

34. The glass article of claim 27, wherein the alkali aluminosilicate glass is ion exchanged to form a compressive stress layer on at least one surface of the glass article.

35. The glass article of claim 34, wherein the ion exchanged glass has a compressive stress of at least 350 MPa and a compressive depth of layer of at least 15 microns.

36. The glass article of claim 33, wherein the ion exchanged glass has a central tension of at least 10 MPa.

37. The glass article of claim 27, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % ≤ $Li_2O+Na_2O+K_2O$ ≤ 20 mol % and 0 mol % ≤ MgO+CaO ≤ 10 mol %.

38. The glass article of claim 27, wherein the alkali aluminosilicate glass comprises at least 58 mol % $SiO_2$ and at least one alkali metal modifier, wherein the ratio, expressed in mol %, $(Al_2O_3 (mol\%)+B_2O_3 (mol\%))/\Sigma(modifiers (mol\%))>1$, and wherein the modifiers are selected from the group consisting of alkali metal oxides and alkaline earth metal oxides.

39. The glass article of claim 38, wherein the alkali aluminosilicate glass comprises: 60-72 mol % $SiO_2$; 9-16 mol % $Al_2O_3$; 5-12 mol % $B_2O_3$; 8-16 mol % $Na_2O$; and 0-4 mol % $K_2O$. wherein the alkali aluminosilicate glass comprises: 60-72 mol % $SiO_2$; 9-16 mol % $Al_2O_3$; 5-12 mol % $B_2O_3$; 8-16 mol % $Na_2O$; and 0-4 mol % $K_2O$.

40. The glass article of claim 27, wherein the alkali aluminosilicate glass comprises: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO.

* * * * *